(12) United States Patent
Muratov et al.

(10) Patent No.: US 11,726,585 B2
(45) Date of Patent: Aug. 15, 2023

(54) INDUCTIVE BEACON FOR TIME-KEYING VIRTUAL REALITY APPLICATIONS

(71) Applicant: MEDIATEK Singapore Pte. Ltd., Singapore (SG)

(72) Inventors: Vladimir Alexander Muratov, San Jose, CA (US); Da-Shan Shiu, Taipei (TW); William Plumb, Charlestown, MA (US); Philip Frank Tustin, North Andover, MA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/473,995

(22) Filed: Sep. 13, 2021

(65) Prior Publication Data
US 2022/0066572 A1 Mar. 3, 2022

Related U.S. Application Data

(62) Division of application No. 16/026,571, filed on Jul. 3, 2018, now Pat. No. 11,237,649.
(Continued)

(51) Int. Cl.
*G06F 3/038* (2013.01)
*G06F 3/01* (2006.01)
(Continued)

(52) U.S. Cl.
CPC .......... *G06F 3/038* (2013.01); *G01D 5/2006* (2013.01); *G01S 1/7036* (2019.08); *G01S 1/7038* (2019.08);
(Continued)

(58) Field of Classification Search
CPC .......... G06F 3/038; G06F 3/011; G06F 3/014; G06F 3/017; G01D 5/2006; G01S 1/7036;
(Continued)

(56) References Cited

U.S. PATENT DOCUMENTS 4,560,930 A 12/1985 Kouno
6,369,564 B1 4/2002 Khalfin et al.
(Continued)

FOREIGN PATENT DOCUMENTS

CN 103842843 A 6/2014
CN 103869294 A 6/2014
(Continued)

OTHER PUBLICATIONS

Extended European Search Report dated Dec. 7, 2018 in connection with European Application No. 18187859.6.
(Continued)

*Primary Examiner* — Christopher P McAndrew
(74) *Attorney, Agent, or Firm* — Wolf, Greenfield & Sacks, P.C.

(57) ABSTRACT

Circuits for controlling magnetic-based tracking systems are described. These systems may be used in virtual reality applications, for example to track in real-time the location of one or more body parts. The systems use a beacon emitting mutually orthogonal magnetic fields. On the receiver side, one or more sensors disposed on different parts of a body receive the magnetic fields. The beacon includes switching amplifiers for driving the magnetic field emitters. Being binary, these amplifiers may be controlled by binary signals. The circuits may exhibit a resonant frequency response, and may be operated off-resonance, thus providing for a better control of the magnetic fields amplitude. As a result, however, fluctuations in the envelop of the magnetic fields due to the presence of a beating tone may arise. These fluctuations may be shortened by gradually activating the drivers for the magnetic field emitters.

19 Claims, 8 Drawing Sheets

Related U.S. Application Data

(60) Provisional application No. 62/543,402, filed on Aug. 10, 2017.

(51) Int. Cl.
*G01S 1/70* (2006.01)
*G01D 5/20* (2006.01)
*H01F 7/06* (2006.01)

(52) U.S. Cl.
CPC .............. *G06F 3/011* (2013.01); *H01F 7/064* (2013.01); *G06F 3/014* (2013.01); *G06F 3/017* (2013.01)

(58) Field of Classification Search
CPC .......... G01S 1/7038; G01S 1/04; H01F 7/064; H04B 1/04
USPC ..................................... 324/207.17
See application file for complete search history.

(56) References Cited

U.S. PATENT DOCUMENTS

| | | | |
|---|---|---|---|
| 6,427,079 B1 * | 7/2002 | Schneider | A61B 5/062 600/424 |
| 6,525,530 B1 | 2/2003 | Jansson et al. | |
| 6,624,626 B2 | 9/2003 | Khalftn | |
| 2001/0006369 A1 | 7/2001 | Ely | |
| 2006/0181271 A1 | 8/2006 | Lescourret | |
| 2009/0076746 A1 | 3/2009 | Higgins | |
| 2009/0115406 A1 | 5/2009 | Anderson et al. | |
| 2009/0118113 A1 | 5/2009 | Yagi | |
| 2012/0105992 A1 | 5/2012 | Dina et al. | |
| 2013/0238270 A1 | 9/2013 | Khalftn et al. | |
| 2014/0015522 A1 * | 1/2014 | Widmer | H02J 50/60 324/239 |
| 2014/0203972 A1 | 7/2014 | Vock et al. | |
| 2017/0090568 A1 * | 3/2017 | Chen | G06F 3/014 |
| 2017/0155194 A1 * | 6/2017 | Kanno | H01Q 5/335 |
| 2019/0049544 A1 | 2/2019 | Muratov et al. | |
| 2019/0113325 A1 * | 4/2019 | Chung | G01C 21/165 |

FOREIGN PATENT DOCUMENTS

| | | |
|---|---|---|
| CN | 104094367 A | 10/2014 |
| CN | 104246534 A | 12/2014 |
| WO | WO 2010/085877 | 8/2010 |

OTHER PUBLICATIONS

Merino et al., LC tank full bridge control for large coil variations, 2012 19$^{th}$ IEEE International Conference on Electronics, Circuits and Systems (ICECS), Dec. 9, 2012, pp. 653-656.

Roetenberg et al., A portable magnetic position and orientation tracker, Sensors and Actuators: A Physical, Elsevier BV, NL, vol. 135, No. 2, Apr. 4, 2007, pp. 426-432.

* cited by examiner

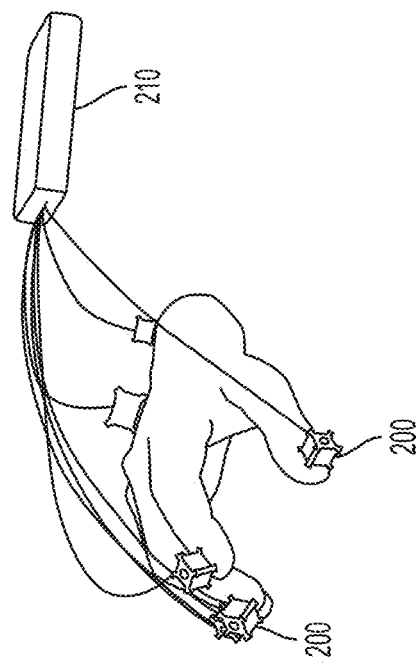
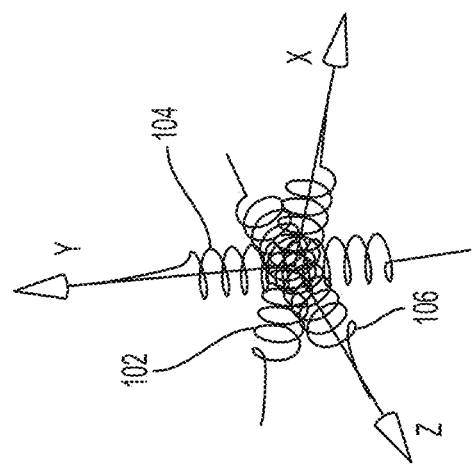
FIG. 1A

INDUCTIVE BEACON FOR TIME-KEYING VIRTUAL REALITY APPLICATIONS

This Application is a Division of U.S. application Ser. No. 16/026,571, filed Jul. 3, 2018, entitled "INDUCTIVE BEACON FOR TIME-KEYING VIRTUAL REALITY APPLICATIONS", which claims priority under 35 U.S.C. § 119(e) to U.S. Provisional Application Ser. No. 62/543,402, entitled "INDUCTIVE BEACON FOR TIME-KEYING VIRTUAL REALITY APPLICATIONS" filed on Aug. 10, 2017, which is herein incorporated by reference in its entirety.

BACKGROUND

Virtual reality systems are gaining increasing popularity in numerous applications such as video gaming, architectural design and virtual training. Current virtual reality applications, both mobile phone based and non mobile phone based, typically use a display such as a computer monitor or virtual reality headset and/or speakers to immerse the user in a virtual environment using visual or audiovisual effects. To allow the user to interact with the virtual environment, a sensor may sense information, such as the position of the user's body, and provide that information to the virtual reality system to update the virtual environment based on movement by the user. Examples of sensors that have been used in virtual reality systems include motion tracking cameras and handheld motion tracking remotes.

BRIEF SUMMARY

Some embodiments relate to a method for generating a beacon signal to be used in determining a position and/or orientation of an object. The method may comprise causing a first coil to generate a first magnetic field and a second coil to generate a second magnetic field, at least in part by controlling a first driver coupled to the first coil with a first binary control signal and a second driver coupled to the second coil with a second binary input signal and activating the first driver with an activation circuit having a ramped response.

Some embodiments relate to an apparatus for generating a beacon signal to be used in determining a position and/or orientation of an object. The apparatus may comprise a control circuit configured to: cause a first coil to generate a first magnetic field and a second coil to generate a second magnetic field, at least in part by: controlling a first driver coupled to the first coil with a first binary control signal and a second driver coupled to the second coil with a second binary input signal and activating the first driver with an activation circuit having a ramped response.

Some embodiments relate to an apparatus for producing a beacon signal for determining a position and/or orientation of an object. The apparatus may comprise a first driver coupled to a first coil and a second driver coupled to a second coil, wherein the first and second drivers exhibit resonant frequency responses, and an activation circuit configured to activate at least one driver among the first and second drivers with a ramped response.

The foregoing summery is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

FIG. 1A illustrates schematically a virtual reality environment using magnetic induction for tracking the location of body parts of a user, according to some non-limiting embodiments.

DETAILED DESCRIPTION

Figure 1B:
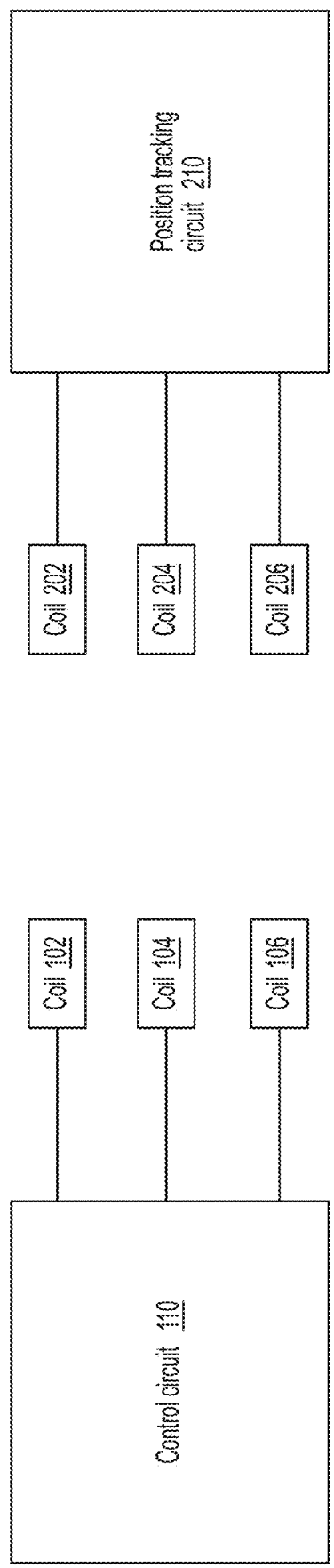
FIG. 1B is a block diagram illustrating a possible system for magnetically tracking the location of body parts of a user, according to some non-limiting embodiments.

The inventors have recognized and appreciated that current magnetic-based tracking systems for use in virtual reality applications suffer from either poor sampling rates or high-power consumption. As a result, the market lacks a wide variety of affordable products that are capable of seamlessly tracking real-time motion time motion of body parts or other components while also being battery-powered. Magnetic-based tracking systems are used in virtual reality applications (such as in gaming, remote surgery, multimedia, and military applications, among others) to track in real-time and in space the location of one or more objects. Specifically, the location of the objects) can be determined by magnetic induction between a beacon positioned in the surrounding environment and sensor(s) positioned on the object(s) being tracked. The signal(s) provided by a beacon for determining the location anal; or orientation of an object are referred to as beacon signals.

In order to accurately track real-time motion of objects, such as limbs, fingers and other body parts, in some applications it may be important for the system to be able to provide a sufficiently high sampling rate (i.e., the rate at which the location of an object is determined over time). Certain applications, for example, may demand sampling rates as high as 400 Hz. One challenge associated with magnetic-based tracking systems, however, is the trade-off between sampling rate and power consumption. That is, systems designed with high sampling rates may exhibit high-power consumption, thus making battery powered implementations challenging. Furthermore, prior systems are also bulky, thus limiting their portability and as a result the types of applications in which they can be deployed.

Recognizing these challenges, the inventors have developed magnetic tracking systems for virtual reality applications that can exhibit low power consumption, high sampling rates, and are also compact. Some embodiments of the present application are directed to virtual reality tracking systems able to achieve low-power consumption by using switching amplifiers for driving the magnetic emitters. Compared to traditional linear amplifier drivers, the switching amplifiers used by the inventors reduce the current flowing through the transistors, and as a result, the power consumption.

Furthermore, the systems developed by the inventors provide stable control of the amplitude of the magnetic fields, and hence accurate measures of location, by operating resonance-based beacons off-resonance. Accordingly, the inventors have recognized that operating the beacon away from its resonance renders the amplitude of the magnetic field less susceptible to undesired changes in the resonant frequency due to, among other causes, temperature and process variations. In fact, the frequency response is steeper in the spectral region close to the resonance than it is away from the resonance. As a result, undesired changes in the resonance can lead to substantial changes in amplitude close to the resonance, but the amplitude changes are less serious away from the resonance.

One drawback arising from the use of switching amplifiers operating off-resonance is that these types of amplifiers take longer times, compared to linear amplifiers, to reach steady state. In other words, they exhibit longer transient times, in which the amplitude of the magnetic field may be too unstable to support accurate measures of position. These long transients may be caused, at least in some circumstances, by the fact that a beating tone arises due to the off-resonance operation, and that the beating tone can take long times to attenuate. In particular, the beating tone may arise from the interference of two signals: the tone oscillating at the resonant frequency and the drive signal, which may have a fundamental frequency different than the resonant frequency.

Nonetheless, the inventors have appreciated that this drawback can be overcome (or at least limited) by using switching amplifiers that are activated by circuits having ramped responses. Examples of ramped responses include, among others, stepped response with at least two steps. The use of circuits having ramped responses enable a gradual activation of the switching amplifiers, which can accelerate the attenuation of the beating tone. This acceleration leads to shorter transient times. Shorter transient times, in turn, can enable higher sampling rates, since the time needed to accurately sample the location of an object is reduced.

FIG. 1A is a schematic diagram illustrating a representative magnetic-based tracking system, in accordance with some non-limiting embodiments. The left-hand side of FIG. 1A shows three coils oriented along mutually orthogonal axes. Coil 102 is oriented along the x-axis, coil 104 is oriented along the y-axis and coil 106 is oriented along the z-axis. It should be noted that other embodiments may be such that the coils are substantially mutually orthogonal (e.g., angled from one another between 80° and 100°). The coils may be formed in any suitable manner, including for example by wrapping conductive wires around a support multiple times. The coils may be driven with alternate currents (AC), and as a result may emit magnetic fields via induction. The emitted magnetic fields may travel in space and may reach the location of an object to be tracked. The right-hand side of FIG. 1A illustrates schematically a hand of a user. As illustrated, multiple sensors 200 have been deployed on the user's hand in this case. Each sensor 200 may be configured to track motion of a respective part of the user's body, such as the user's fingers, the palm or back of the hand, the wrist, etc. The sensors 200 may include coils or other magnetic detectors and may be configured to sense the magnetic fields provided by coils 102, 104, and 106.

Sensors 200 may transfer signals representative of the sensed magnetic fields to position tracking circuit 210. Position tracking circuit 210 may be connected to the sensors 200 via wires (as shown in FIG. 1A) or wirelessly, such as through Wi-Fi or Bluetooth. While sensors 200 and position tracking circuit 210 are illustrated as being separate components in FIG. 1A, in other embodiments one or more sensors 200 may include position tracking circuit 210 therein. For example, a sensor 200 and a position tracking circuit 210 may be disposed in the same package, and the package may be disposed on the object to be tracked.

The location of a sensor 200, and hence the location of the body part on which the sensor 200 is deployed, can be determined based on the amplitudes of the received magnetic fields. In general, the amplitude of a magnetic field decays as it propagates away from its source. For example, spherical magnetic waves, which occur in the far-field zone, decay with $1/r^2$, where r is the distance from the source. Therefore, by determining the amplitude of each of the three emitted magnetic fields, and assuming that the system has been pre-calibrated, the location of the sensor 200 relative to the source can be determined.

FIG. 1B is a block diagram of a representative system implementing the techniques described in connection with FIG. 1A. In this case, a control circuit 110 provides the AC drive currents to the coils 102, 104, and 106. Control circuit 110 may include amplifiers and circuits for timing the emission of the magnetic fields. Control circuit 110 and coils 102, 104, and 106 are collectively referred to as the beacon. Of course, the beacon may also include other components not described herein. On the receiver side, in this case, each sensor 200 includes a triad of coils 202, 204, and 206, which are connected to position tracking circuit 210. The coils 202, 204, and 206 may be oriented in mutually orthogonal (or at least substantially mutually orthogonal) directions. It should be appreciated that the orientation of the coils 202, 204, and 206 may be different from the orientation of the coils 102, 104, and 106. For example, while coils 102, 104, and 106 may be oriented consistently with the xyz coordinate system, coils 202, 204, and 206 may be rotated with respect to such a coordinate system. In these circumstances, each receiving coil receives not only one of the three emitted magnetic fields, but possibly all of them. Therefore, determining the location of the body part relative to the beacon may involve a matrix transformation, which may be performed by position tracking circuit 210. In addition or in alternative to determining the position of an object, the matrix transformation may provide the orientation of the object. In fact, in some applications, determining not only the position but also the orientation of an object may be important.

The embodiments described in connection with FIGS. 1A-1B are such that the transmitter is stationery (the beacon) and the receivers are mobile (the sensors). However, the opposite configuration is also possible in some embodiments. That is, magnetic field emitters may be deployed on the body parts to be tracked and the receiving circuit may be deployed on a stationary receiver, where the matrix transformations are performed.

Figure 2:
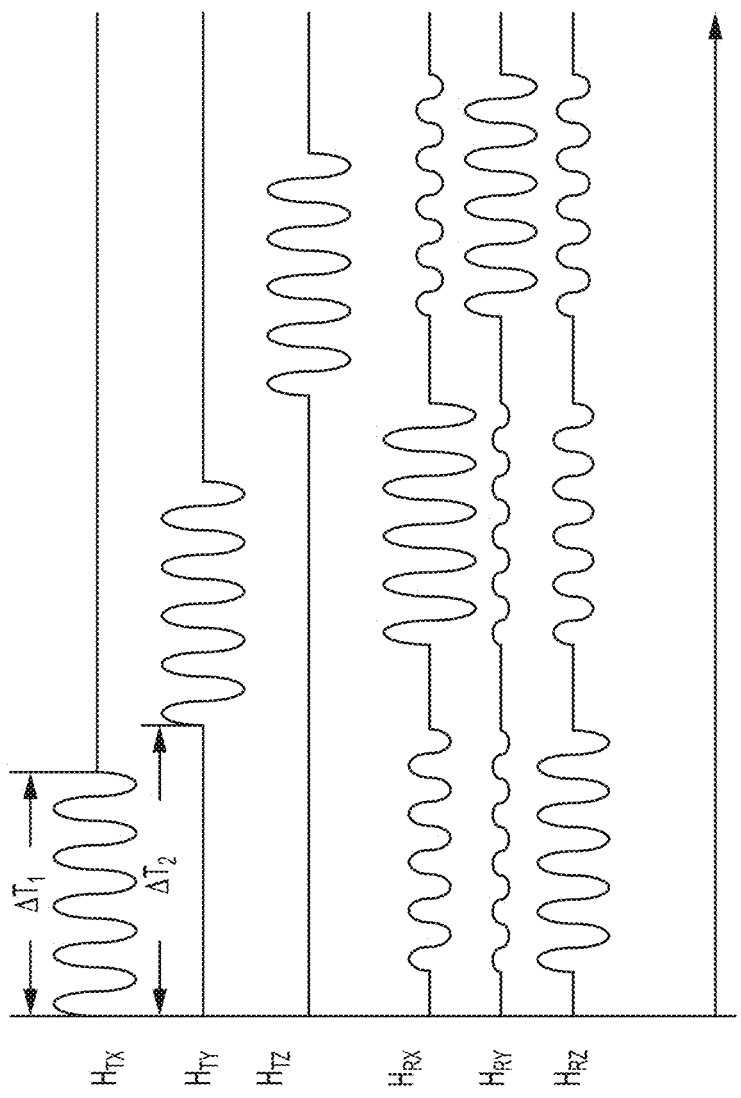
FIG. 2 is a chart illustrating the amplitudes of the three mutually orthogonal magnetic fields and the amplitudes of the magnetic fields received at a sensor, according to some non-limiting embodiments.

FIG. 2 is a chart illustrating how the magnetic fields may be devised at least in some embodiments. $H_{TX}$, $H_{TY}$, and $H_{TZ}$, represent the amplitudes of three respective emitted magnetic fields. The three magnetic fields have substantially mutually orthogonal directions. In one example, $H_{TX}$ emitted by coil 102, $H_{TY}$ is emitted by coil 104, and $H_{TZ}$ is emitted by coil 106. As shown in FIG. 2, the magnetic fields may be emitted in bursts. That is, first a $H_{TX}$ burst is emitted, then a $H_{TY}$ burst is emitted and then a $H_{TZ}$ burst is emitted (though of course the order in which the three bursts are emitted may be changed). $\Delta T_1$ represents the duration of the bursts, and may be for example between 200 μs and 800 μs, between 200 μs and 600 μs, between 300 μs and 500 μs, between 350 μs and 450 μs, or between 390 μs and 410 μs, $\Delta T_2$ represents the separation between one burst and the next, and may be for example between 200 μs and 600 μs, between 300 μs and 500 μs, between 370 μs and 470 μs, or between 410 μs and 430 μs.

$H_{RX}$, $H_{RY}$, and $H_{RZ}$, represent the amplitudes of the magnetic fields received at a sensor 200. In one example, $H_{RX}$ is received at coil 202, $H_{RY}$ is received at coil 204, and $H_{RZ}$ is received at coil 206. In this case, coils 202, 204 and 206 are rotated relative to coils 102, 104 and 106. As a result, each received signal is a combination of the three transmitted magnetic fields. The location of the sensor 200 may be determined by solving a matrix transformation equation system.

Synchronization of the receiver to the transmitter may be achieved, at least in some embodiments, by including a pause between adjacent sets of bursts. For example, the beacon may transmit the following sequence: x-burst, y-burst, z-burst, pause, x-burst, y-burst, z-burst, pause, etc. In this way the receiver knows that when a pause is detected, an x-burst will follow next.

As described above, control circuit 110 may be arranged to drive the coils 102, 104 and 106 with AC signals. In some embodiments, control circuit 110 may drive the coils using switching amplifiers. Switching amplifiers of the types described herein may be configured to operate as electronic switches rather than as linear gain stages. The switching amplifiers may be arranged, for example, to toggle, depending on a control signal, between the supply rails. An example of a circuit including switching amplifiers that may be used at least in some embodiments as control circuit 110 is illustrated in FIG. 3.

Figure 3:
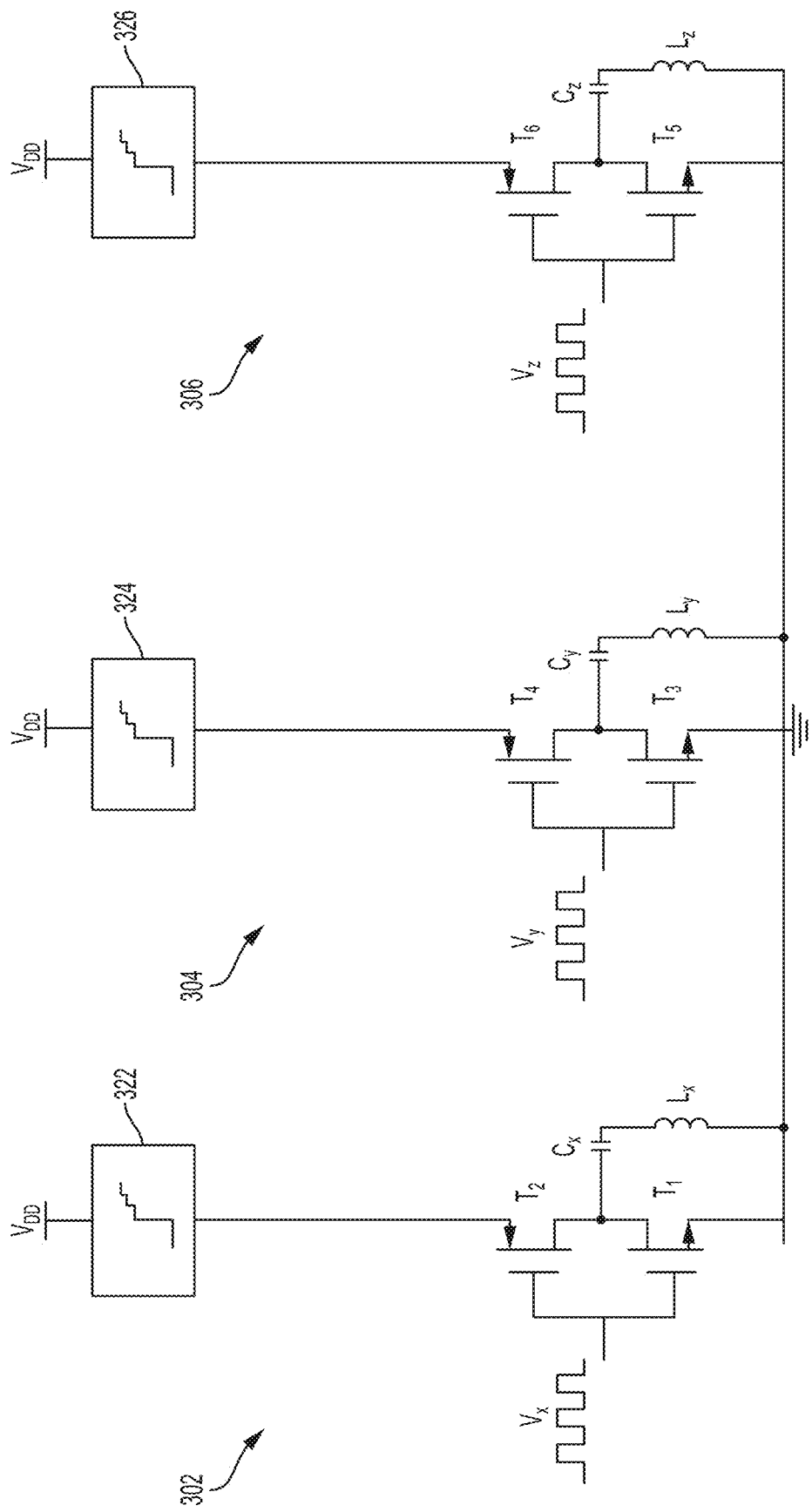
FIG. 3 is a circuit diagram illustrating an example of a control circuit, according to some non-limiting embodiments.

The control circuit of FIG. 3 includes drivers 302, 304 and 306. Each driver drives a respective coil $L_x$, $L_y$, and $L_z$ (which may serve respectively as coils 102, 104, and 106). That is, the driver provides an AC current to the respective coil, which in response produces a magnetic field. Driver 302 includes transistors $T_1$ and $T_2$, capacitor $C_x$, coil $L_x$ and activation circuit 322. Driver 304 includes transistors $T_3$ and $T_4$, capacitor $C_y$, coil $L_y$ and activation circuit 324. Driver 306 includes transistors $T_5$ and $T_6$, capacitor $C_z$, coil $L_z$ and activation circuit 326. Transistors $T_1$ and $T_2$ may be configured to receive a binary control signal $V_x$, and consequently may behave as a switching amplifier (e.g., a class-D amplifier). Transistors $T_1$ and $T_2$ may be arranged, among other configurations, as a CMOS inverter or as an inverter comprising bipolar transistors. BiCMOS implementations are also possible. Transistors $T_3$ and $T_4$ (which receive binary control signal $V_y$) and transistors $T_5$ and $T_6$ (which receive binary control signal $V_z$) may be arranged in a similar manner. While activation circuits 322, 324 and 326 are illustrated as separate components, in some embodiments, a single activation circuit may be used for multiple drivers (e.g., for all the drivers).

Figure 4:
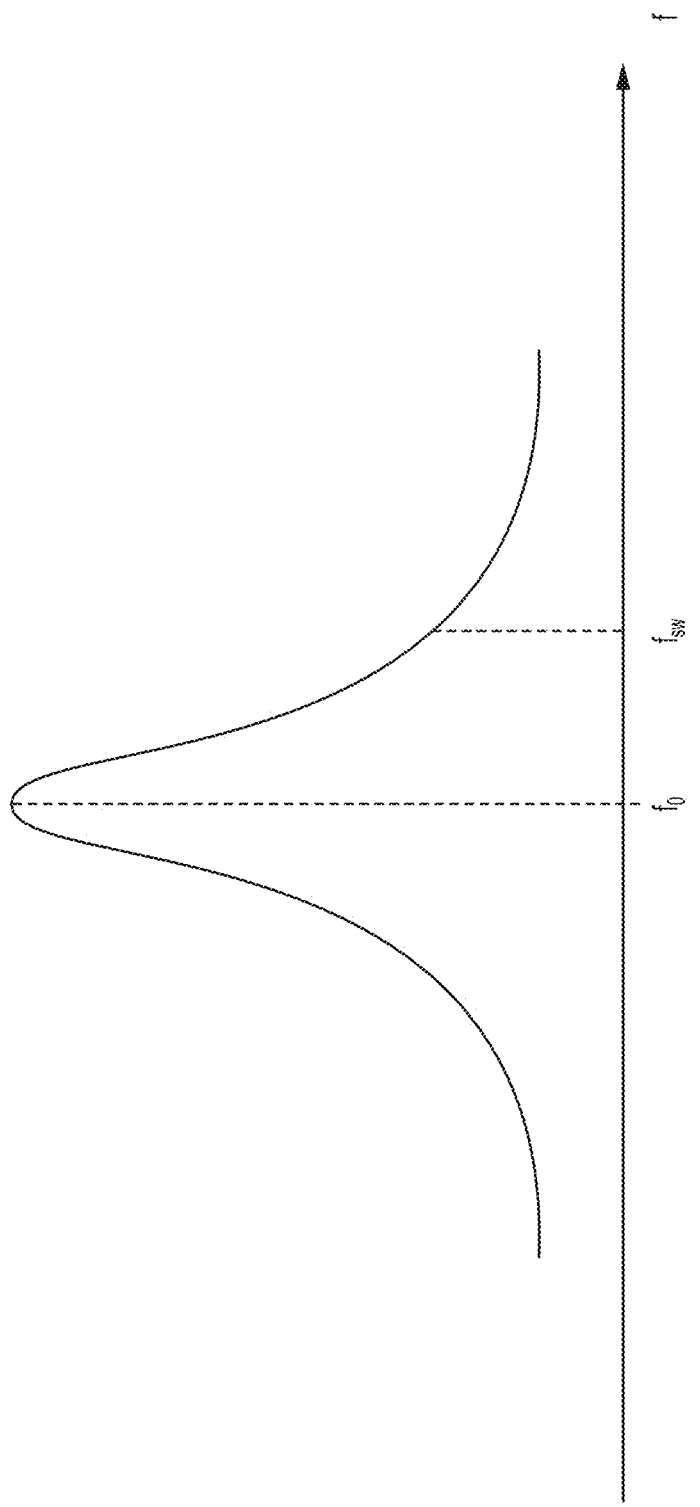
FIG. 4 is a plot illustrating a possible resonant response for the control circuit of FIG. 3, according to some non-limiting embodiments.

Because they receive binary control signals, the transistors may operate above threshold only in the high-state (e.g., when the output voltage is locked to the higher supply rail $V_{DD}$). This may in turn limit the current flowing in the transistors only to certain time intervals, thus limiting the driver's overall power consumption. Capacitor $C_x$ and coil $L_x$ (and similarly, capacitor $C_y$ and coil $L_y$, and capacitor $C_z$ and coil $L_z$) may be configured to cause the driver to exhibit a resonant frequency response. The frequency of the resonance may depend, among other parameters, on the capacitance of the capacitor and the inductance of the coil. For example, resonant frequency $f_{x0}$ may be given by $(L_x C_x)^{-1/2}/2\pi$, $f_{y0}$ by $(L_y C_y)^{-1/2}/2\pi$ and $f_{z0}$ by $(L_z C_z)^{-1/2}/2\pi$. A representative resonant response having a resonant frequency $f_0$ is illustrated in FIG. 4. Any one of drivers 302, 304 and 306 may exhibit a response similar to that of FIG. 4. In some embodiments, $L_x C_x = L_y C_y = L_z C_z$, though not all embodiments are limited in this respect.

In some embodiments, the drivers may be driven off-resonance. That is, the fundamental harmonic ($f_{sw}$) of the control signals $V_x$, $V_y$, and $V_z$ may be different from the resonant frequency of the drivers. As further illustrated in FIG. 4, frequency $f_{sw}$ is different than (greater than, in this case) frequency $f_0$. The inventors have appreciated that operating the driver off-resonance may enable an accurate control of the amplitude of the emitted magnetic field. In fact, the amplitude of the frequency response away from the resonance is less steep than it is closer to the resonance. As a result, the amplitude of the magnetic field is less susceptible to changes in the resonant frequency $f_0$ caused for example by process and temperature variations. In some embodiments, the binary control signals $V_x$, $V_y$, and $V_z$ may have mutually different fundamental harmonics. For example, the fundamental harmonic of $V_x$ may be $f_x$, the fundamental harmonic of $V_y$ may be $f_y$ and the fundamental harmonic of $V_z$ may be $f_z$, where $f_x \neq f_y \neq f_z$. In one specific example, the mid fundamental harmonic among the three fundamental harmonics may be equally spaced from the other two fundamental harmonics (e.g., $f_x - f_y = f_y - f_z$, where, for example, $f_x - f_y = (f_x - f_z)/2$). In another specific example, the ratio between a first and a second fundamental harmonics may be equal to the ratio between the second and the third fundamental harmonics. For example, $f_y/f_x = f_z/f_y = a$, where a is a positive real number.

A drawback arising from operating the drivers off-resonance is that a beating tone oscillating at $|f_{sw} - f_0|$ arises. The beating tone may result in a periodic fluctuation in the envelop of the magnetic field. This fluctuation is not desirable because it negatively affects a sensor 200's ability to determine its position. The beating tone may attenuate over time, but the attenuation time may be long. This translates in a reduction of the maximum rate at which the location of a sensor 200 may be sampled. The inventors have appreciated that the transient of the beating tone may be substantially shortened by activating the bursts in a gradual manner, for example using circuits with ramped responses.

Referring back to FIG. 3, the drivers further include activation circuits 322, 324 and 326. The activation circuits may be all implemented in the same manner in some cases, though not all embodiments are limited in this respect. The activation circuits may be arranged to couple the drivers to the supply rail $V_{DD}$ in a gradual manner. For example, the activation circuits may exhibit a ramped response. The ramped response may exhibit gradually increasing steps, and/or may at least in part be continuous (e.g., linear). As a result, the driver may be activated in a gradual fashion. When a driver is activated gradually in this manner, the transient of the beating tone is shortened. Ramped responses of the types described herein may at least in some embodiments be monotonic. In some embodiments, the ramped responses may reach their maximum value in more than 50 μs or more than 100 μs.

Figure 5:
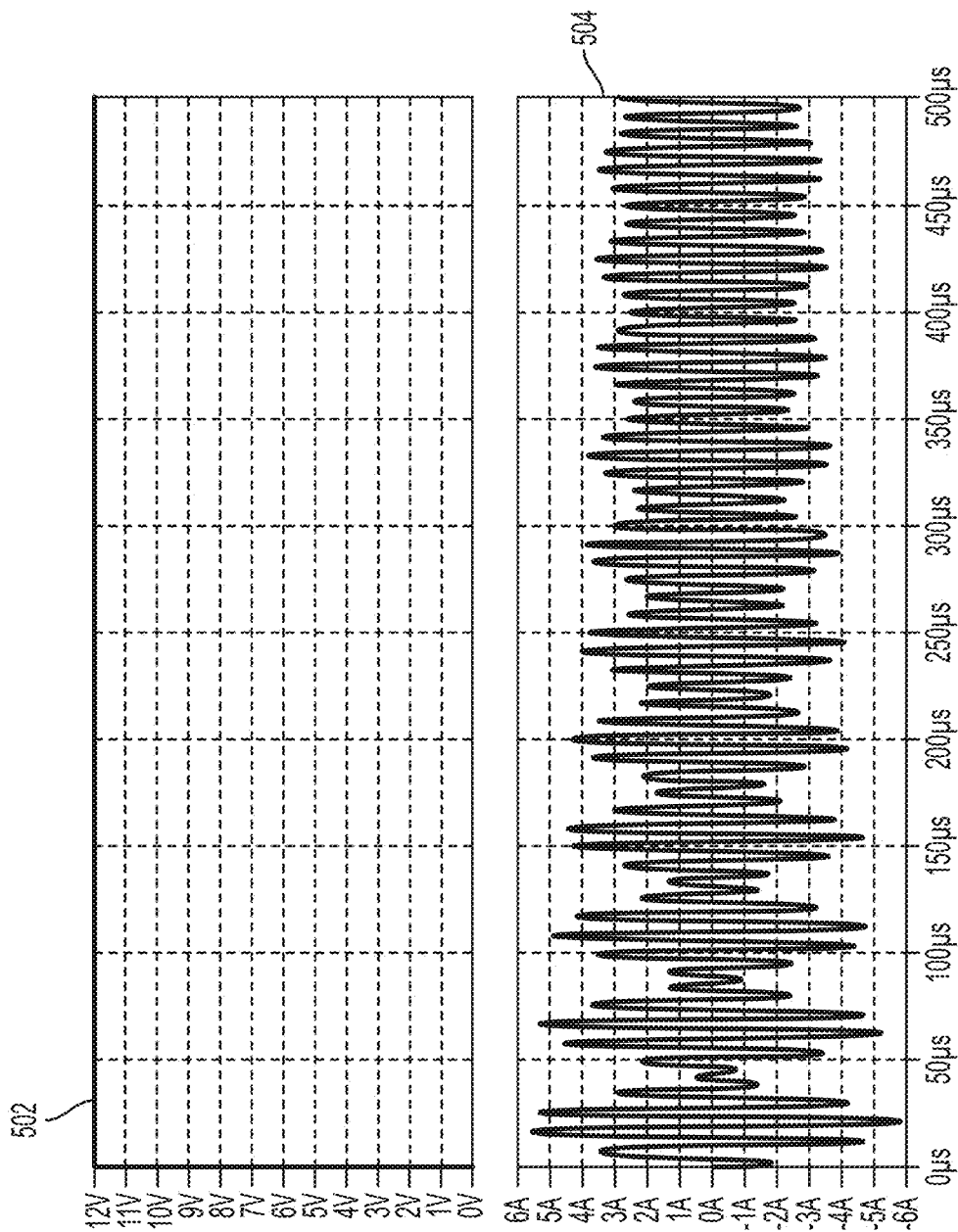
FIG. 5 is a chart illustrating the current flowing through a coil when the driver is activated with one step, according to some non-limiting embodiments.

The following examples illustrate how gradually activating a driver can shorten the duration of a beating tone. FIG. 5 illustrates an example in which a driver is not activated gradually. That is, the driver is activated from the lower rail (0V in this case) directly to the higher rail ($V_{DD}$ in this case). Curve 502 represents the response of an activation circuit with an abrupt activation. Curve 504 represents the current flowing in a coil when the driver is activated according to curve 502. As illustrated, the envelop of the current fluctuates due to the presence of the beating tone, which decays very slowly. Though only a 500 μs-window is illustrated in this example, steady state is reached only after 2 ms from the activation of the circuit at t=0. That means that it will take the receiving sensor 200 at least 2 ms before being able to produce an accurate location measurement. As a result, the highest sampling rate that can be achieved in this configuration is approximately 166.67 Hz (1/2 ms=500 Hz divided by three, the number of bursts), which may be insufficient in certain virtual reality applications.

Figure 6A:
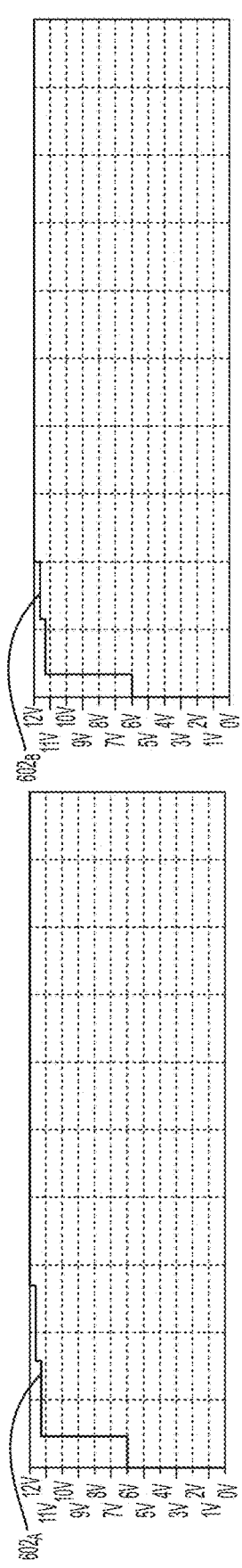
FIGS. 6A-6D are charts illustrating currents flowing through a coil when the drive are activated gradually, according to some non-limiting embodiments.
Figure 6B:
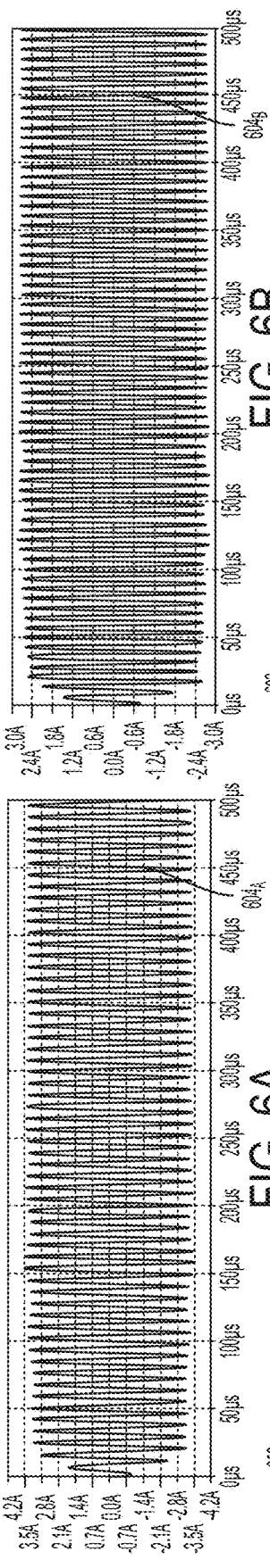
Figure 6C:
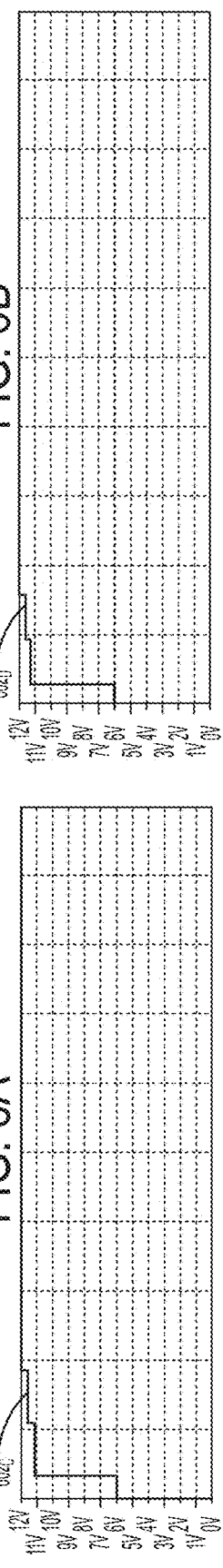
Figure 6D:
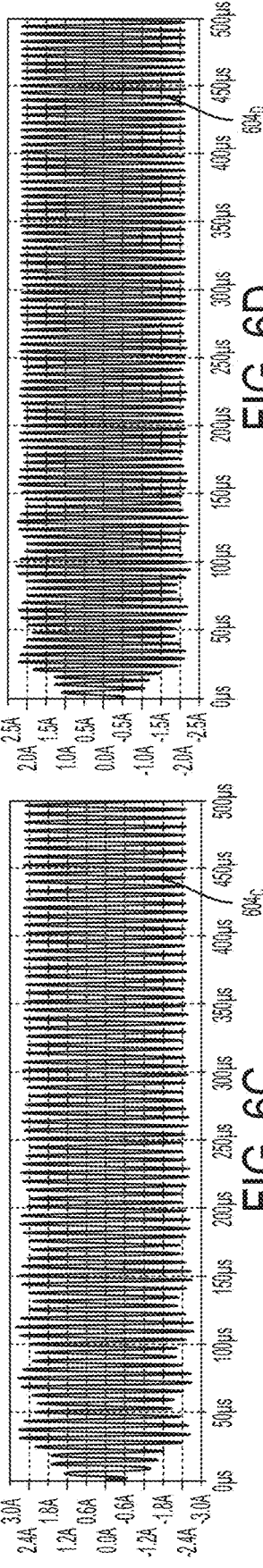

FIGS. 6A, 6B, 6C and 6D illustrate examples in which the drivers are activated gradually. Curves 602$_A$, 602$_B$, 602$_C$, and 602$_D$ are four exemplary responses of the activation circuits. In FIG. 6A, the higher rail is reached in about 140 μs and in four steps. The corresponding current flowing through the coil (604$_A$) reaches steady state in about 400 μs. In FIG. 6B, the higher rail is reached in about 100 μsand in four steps. The corresponding current flowing through the coil (604$_B$) reaches steady state in about 450 μs. In FIG. 6C, the higher rail is reached in about 90 μs and in four steps. The corresponding current flowing through the coil (604$_C$) reaches steady state in about 500 μs. In FIG. 6D, the higher rail is reached in about 80 μs and in four steps. The corresponding current flowing through the coil (604$_D$) reaches steady state in about 600 μs. As a result, sampling frequencies in excess of 600 Hz may be achieved.

In the examples described in connection with FIGS. 6A-6D, only one burst is illustrated. It should be appreciated, however, that gradual activation as described herein (for example using circuits having ramped responses) may be applied, at least in some embodiments, to all the bursts.

In the embodiments described above, gradual activation of the drivers is achieved using activation circuits 322, 324 and 326. However, any other suitable scheme to achieve gradual activation of the drivers may be used. For example, in some embodiments, the control signals Vx, Vy and Vz may be, prior to being provided to the transistors, multiplied by window functions having ramped shapes (similar to the ramped responses described above).

As illustrated, the transient time may be reduced for example by increasing the time of activation of the driver. Other parameters that may affect the transient time are the number of steps, the duration of each step, and the size of the discontinuities among the steps. Increasing the number of steps may further decrease the transient time, but it may also call for a more complex control circuitry.

Figure 7:
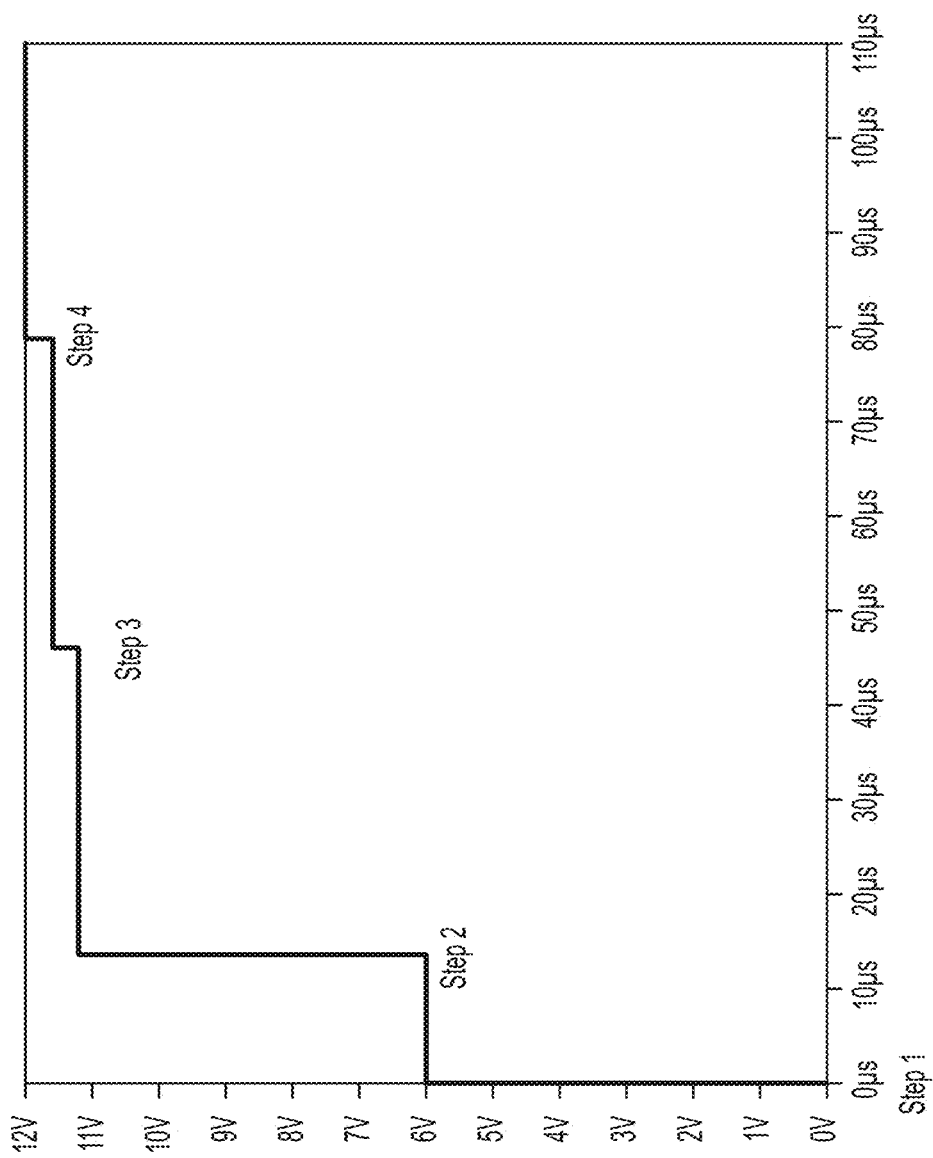
FIG. 7 is a plot illustrating a specific example of a ramped response, according to some non-limiting embodiments.

FIG. 7 illustrates a specific example of a ramped response. In this example, step 1 jumps (at T=0) from 0V to $V_{MAX}/2$. Step 2 jumps (at $T=0.5/(f_{sw}-f_0)-0.5/f_{sw}$) from $V_{MAX}/2$ to $V_{MAX}/2+(7/16)V_{MAX}$. Step 3 jumps (at $T=1.5/(f_{sw}-f_0)-0.5/f_{sw}$) from $V_{MAX}/2+(7/16)V_{MAX}$ to $V_{MAX}/2+(7/16)V_{MAX}+(1/32)V_{MAX}$. Step 4 jumps (at $T=2.5/(f_{sw}-f_0)-0.5/f_{sw}$) from $V_{MAX}/2+(7/16)V_{MAX}+(1/32)V_{MAX}$ to $V_{MAX}$. In some embodiments, the times at which the steps jump may slightly deviate from the values described above (e.g., by 10% or less or by 5% or less) and/or the amplitudes of the response may slightly deviate from the values described above (e.g., by 10% or less or by 5% or less).

In general, the time interval between jumps (or at least some of them) may have a duration that is proportional to $1/(f_{sw}-f_0)$, to $1/f_{sw}$, and/or to $1/f_0$, though not all embodiments are limited in this respect. Of course, not all embodiments are limited to having four steps as shown in FIG. 7, as any other suitable number of steps may be included. It should be further noted that, while the steps of FIG. 7 are illustrated as vertical segments, they may have finite slopes in some embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is fir the purpose of description and should not be regarded as limiting. The use of "including", "comprising", "having", "containing" or "involving" and variations thereof herein, is meant to encompass the items listed thereafter and equivalents thereof as well as additional items.

The use of "coupled" or "connected" is meant to refer to circuit elements, or signals, that are either directly linked to one another or through intermediate components.

What is claimed is:

1. A method for generating a beacon signal to be used in determining a position and/or orientation of an object, the method comprising:
    causing a first coil to generate a first magnetic field and a second coil to generate a second magnetic field, wherein the causing comprises:
        providing a first signal waveform that is binary, and has a fundamental harmonic frequency, to a first driver and controlling the first driver to provide a first electric current to the first coil and a first capacitor in series with the first coil using the first signal waveform, a series combination of the first capacitor and the first coil exhibiting a resonant frequency, wherein the fundamental harmonic frequency is different from the resonant frequency;
        providing a second signal waveform that is binary to a second driver and controlling the second driver to provide a second electric current to the second coil and a second capacitor in series with the second coil using the second signal waveform; and
        with an activation circuit, providing a supply voltage to the first driver that increases over time.

2. The method of claim 1, wherein the supply voltage increases in two or more steps.

3. The method of claim 2, wherein the two or more steps occur over a period of time that exceeds 50 μs.

4. The method of claim 1, wherein the first and second magnetic fields are substantially mutually orthogonal.

5. The method of claim 1, further comprising:
    causing a third coil to generate a third magnetic field by providing a fourth signal waveform that is binary to a third driver and controlling the third driver to provide a third electric current to the third coil using a third signal waveform.

6. The method of claim 1, further comprising:
    receiving the first and second magnetic fields with a sensor disposed on the object; and
    determining the position and/or orientation of the object based at least in part on the first and second magnetic fields.

7. The method of claim 1, wherein causing the first coil to generate the first magnetic field and the second coil to generate the second magnetic field further comprises:

causing the first coil to generate a first burst and the second coil to generate a second burst,
wherein the first and second bursts do not overlap with one another.

8. The method of claim 2, wherein the two or more steps have durations that are inversely related to the fundamental harmonic frequency of the first signal waveform and/or to the resonant frequency.

9. The method of claim 1, wherein the supply voltage increases in at least one segment that has a finite slope.

10. An apparatus for generating a beacon signal to be used in determining a position and/or orientation of an object, the apparatus comprising:
a control circuit configured to:
cause a first coil to generate a first magnetic field and a second coil to generate a second magnetic field, wherein the causing comprises:
providing a first signal waveform that is binary, and has a fundamental harmonic frequency, to a first driver and controlling the first driver to provide a first electric current to the first coil and a first capacitor in series with the first coil using the first signal waveform, a series combination of the first capacitor and the first coil exhibiting a resonant frequency, wherein the fundamental harmonic frequency is different from the resonant frequency;
providing a second signal waveform that is binary to a second driver and controlling the second driver to provide a second electric current to the second coil and a second capacitor in series with the second coil using the second signal waveform; and
providing a supply voltage to the first driver that increases over time.

11. The apparatus of claim 10, wherein the supply voltage increases in two or more steps.

12. The apparatus of claim 11, wherein the two or more steps occur over a period of time that exceeds 50 μs.

13. The apparatus of claim 10, wherein the supply voltage increases in at least one segment that has a finite slope.

14. An apparatus for producing a beacon signal for determining a position and/or orientation of an object, the apparatus comprising:
a first driver coupled to a first coil and a second driver coupled to a second coil, wherein the first and second drivers exhibit resonant frequency responses, wherein the first driver is configured to drive the first coil and a first capacitor in series with the first coil with a first electric current in response to receiving a first signal waveform that is binary and has a fundamental harmonic frequency, a series combination of the first capacitor and the first coil exhibiting a resonant frequency, wherein the fundamental harmonic frequency is different from the resonant frequency, and the second driver is configured to drive the second coil with a second electric current in response to receiving a second signal waveform that is binary; and
an activation circuit configured to provide to the first driver a supply voltage that increases over time.

15. The apparatus of claim 14, wherein the first and second drivers comprise switching amplifiers.

16. The apparatus of claim 14, further comprising:
a control circuit coupled to the first and second drivers and configured to control the first and second drivers off-resonance.

17. The apparatus of claim 14, wherein the supply voltage increases in two or more steps.

18. The apparatus of claim 17, wherein the two or more steps occur over a period of time that exceeds 50 μs.

19. The apparatus of claim 14, wherein the supply voltage increases in at least one segment that has a finite slope.

* * * * *